United States Patent [19]

Johnson

[11] Patent Number: 4,589,940

[45] Date of Patent: *May 20, 1986

[54] METHOD OF MAKING FOAMED SLIP RESISTANT SURFACES

[75] Inventor: Michael D. Johnson, Coshocton, Ohio

[73] Assignee: Becton, Dickinson and Company, Paramus, N.J.

[*] Notice: The portion of the term of this patent subsequent to Feb. 11, 2003, has been disclaimed.

[21] Appl. No.: 679,800

[22] Filed: Dec. 10, 1984

Related U.S. Application Data

[60] Division of Ser. No. 512,266, Jul. 11, 1983, Pat. No. 4,514,460, which is a continuation-in-part of Ser. No. 436,253, Oct. 25, 1982, Pat. No. 4,515,851.

[51] Int. Cl.$^4$ .................................................. B32B 31/12
[52] U.S. Cl. .................................... 156/78; 2/161 R; 2/168; 156/293; 427/244; 428/246; 428/253; 428/284; 428/316.6
[58] Field of Search ............... 2/161 R, 167, 168, 169; 156/78, 293; 427/244; 428/245, 246, 250, 253, 284, 316.6

[56] References Cited

U.S. PATENT DOCUMENTS

| | | | |
|---|---|---|---|
| 2,293,927 | 8/1942 | Beal | 427/246 |
| 2,293,928 | 8/1942 | Beal | 51/73 R |
| 3,173,150 | 3/1965 | Mohler | 2/167 |
| 4,089,069 | 5/1978 | Vistins | 2/161 R |
| 4,151,662 | 5/1979 | Vistins | 2/168 X |
| 4,174,542 | 11/1979 | Vistins | 2/48 |
| 4,303,456 | 12/1981 | Schmuck et al. | 156/78 |
| 4,359,783 | 11/1982 | Andrews | 2/161 R |
| 4,497,072 | 2/1985 | Watanabe | 2/167 X |
| 4,555,813 | 12/1985 | Johnson | 2/161 R |

*Primary Examiner*—Robert A. Dawson
*Attorney, Agent, or Firm*—R. P. Grindle

[57] ABSTRACT

An improved abrasion and cut resistant surface is provided for work gloves, work shoes and like wearing apparel. The surface of the invention provides a porous surface particularly useful in work environments where it is necessary for a workman to use gloves, but which gloves are breathable and have moisture absorbing properties. The surface of the invention is a foam surface laminated to a substrate. The foam, prior to lamination, may be foamed with varying amounts of air depending upon the degree of abrasion resistance required. The foaming may be by mechanical or chemical means.

6 Claims, 1 Drawing Figure

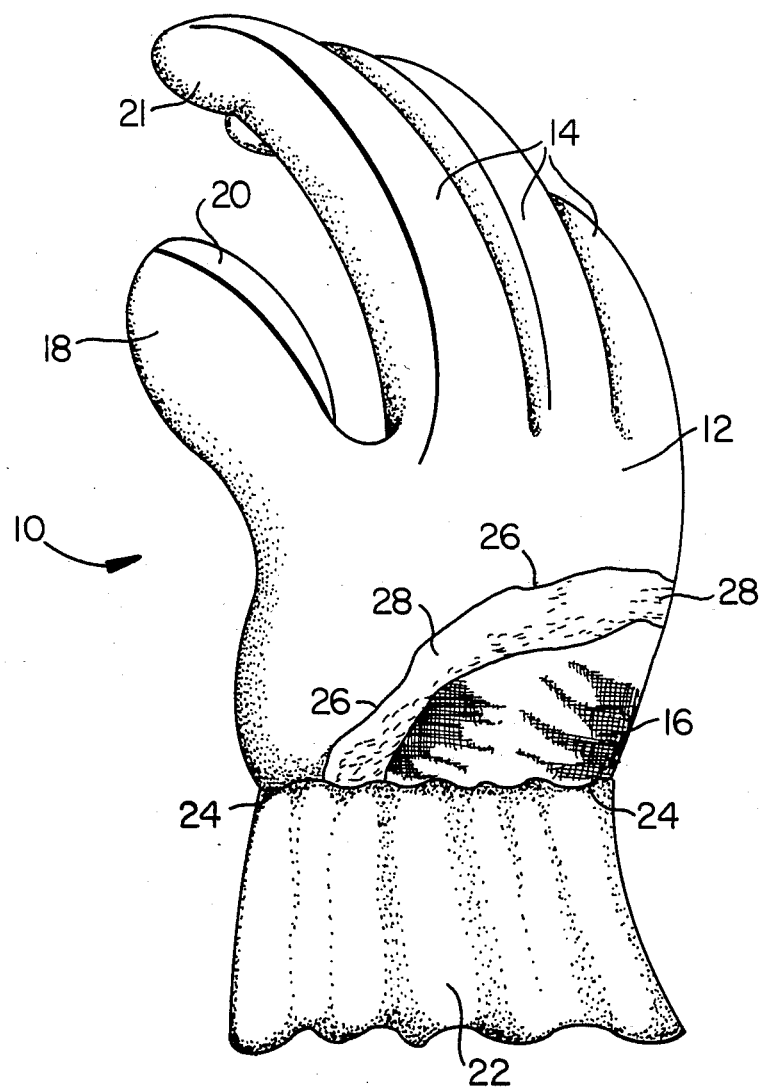

METHOD OF MAKING FOAMED SLIP RESISTANT SURFACES

This is a division of application Ser. No. 512,266, filed 7/11/83, now U.S. Pat. No. 4,514,460, which in turn is a continuation-in-part of U.S. App. Ser. No. 436,253 filed 10/25/82, now U.S. Pat. No. 4,515,851.

BACKGROUND AND STATEMENT OF THE INVENTION

This invention relates to methods for producing a laminate useful in the manufacture of wearing apparel, for example, and to laminates so produced wherein an abrasion resistant or cut resistant gripping surface is required. The laminate includes a porous surface produced initially by foaming which cells then break or collapse, and which surface is useful as a gripping surface for the work environment, and the method of the invention is such that the surface may be controlled to have a lesser or greater degree of abrasion resistance, as required for the subsequent use of the article involved.

The invention includes a substrate which may be a fabric web comprised of a non-woven fibrous web, such as needled felt, a knitted fabric web such as knitted jersey, or a woven fabric, for example. The substrate may be comprised of natural or synthetic fibers or blends thereof including, for example, polyester, or a polyester-cotton blend. The foamed surface is applied to the substrate.

A particular advantage of the invention here is the creation of a garment such as a glove which is lightweight and breathable with a comparatively thin coating on an open weave liner substrate without strike-through or undue absorption of the coating material into the open weave during the coating operation.

The resulting foam surface is porous, as will be understood, and has an enhanced gripping property while at the same time having the flexible, easily manipulatable and comfortable properties of a knitted wool glove. The foam may be comprised of polyurethane, for example, polyvinyl chloride, acrylonitrile, neoprene, or other synthetic or natural rubbers. In addition, in certain applications, it may be appropriate to include a moisture barrier between the substrate and the foam surface. The barrier may be applied as a coating on the substrate, for example. Representative moisture barrier coatings include polyvinyl chloride, acrylonitrile, natural or synthetic rubbers. The moisture barrier layer will be selected to be compatible with the subsequently applied foam layer, as will be understood.

In the past, it has been conventional, in order to apply gripping surfaces to work gloves and such items of wearing apparel or skid resistant floor coverings, to provide a textured surface in one form or another. However, certain disadvantages are involved in the use of such textured surfaces in work gloves and the like in that the coatings required are often comparatively heavy precluding achieving breathability in the resulting product. As will be understood, it is important in certain applications that the garment such as work gloves, boots or work aprons have a breathable property because of the environment in which they are to be used. Moreover, in the production of work gloves, for example, much more routine and substantially less expensive production lines may be used if coatings are applied by dipping the liners loaded on forms for applying the outer coating. However, in the past, such dipping applications were precluded with open weave type fabrics simply because of undue absorption and strike-through of the applied dipped coating into and through the liners to the internal surfaces, thereof. This is undesirable because it interferes with the desired properties of the internal surface of the resulting glove which desired properties include warmth, softness, and moisture absorbancy.

DETAILED DESCRIPTION OF THE INVENTION

With this invention, by contrast, the laminate of the invention provides a substantially increased gripping action while maintaining breathability. That is with the laminate of the invention comprised of a substrate to which a foamed surface is applied, the porous foamed surface serves to provide a combined gripping and breathable property to the surface without interferring with internal surface properties of the liner being coated. The degree of safety involved when using work gloves formed according to the invention is extraordinary as compared to prior art textured surfaces. At the same time an enhanced suppleness is built into articles of clothing including work gloves, making them more comfortable in the work environment.

This is achieved by applying a foamed coating to glove liners, for example, loaded onto forms for the purpose. The foam is low density and, therefore, does not absorb unduly into the material of liner material. Nevertheless, the foam provides an evenly coated surface. By providing a foam having a specific degree of mechanically foamed air content therein, the individual cells forming the surfaces break, leaving a fine coating on the surface which is flexible, but, nevertheless, has a degree of texture as desired for providing a gripping type surface. It will be appreciated,, in this connection, that with the invention here, depending upon the material of the coating and the degree of foaming, larger or smaller cells will be formed in the coating which break to form greater or lesser texture on the surface. Subsequent curing causes the broken cell structure to have a comparatively "hard" finish for gripping, while at the same time providing breathability and flexibility.

In considering generally the conditions for carrying out the invention here for producing the surface of the invention, one may note that it is preferable to use a synthetic knitted or woven web as the substrate, although it will be appreciated that a non-woven web may also be used, depending upon the ultimate use of the surface being formulated. Also, the surface can be applied over other substrates including coated fabrics, coated gloves, or any continuous surface including unsupported gloves which contain no fabric. As discussed above, such coatings may include a liquid coating applied to the substrate by dipping or other procedures including knife applications. Such continuous coatings protect the user of work gloves, for example, from the dangers involved in the work environment by providing good abrasion and cut resistances.

Representative fibrous non-woven webs may be comprised of wool, polyesters, polyamides, such as Kevlar or Nomex which are products of DuPont, polyolefins, such as polypropylene and polyethylene and copolymers of acrylic acid, such as polyacrylonitrile. If a knitted web substrate is used, it may be cotton, polyester, or a cotton-polyester blend. If it is woven, it may be nylon or cotton. The material forming the foamed surface portion of the laminate, in accordance herewith, as discussed above, may be polyurethane, polyvinyl chloride, acrylonitrile, natural or synthetic rubber.

The solids content of the foamed material is mixed with water, as discussed in more detail below, to have a final total solids content within the range of between about 5 and 75 percent and preferably 10 and 30 percent. The material is foamed either by mechanical or chemical means. Preferably, it is foamed by mechanical means to have an air content within the range of between about 40 and 95 percent. The preferred range is 60 to 80 percent. Better abrasion resistance is obtained with a lower air content within the ranges noted above, while better grip and less abrasion resistance is obtained with an air content of a higher percent within the ranges noted above. If a coated substrate is utilized the coating will be selected to the compatible with the subsequently applied foam surface layer. Representative coatings applied to the substrates of the invention include polyvinyl chloride, acrylonitrile, natural rubbers or synthetic rubbers.

With the foregoing and additional objects in view, this invention will now be described in more detail, and other objects and advantages thereof will become apparent from the following description, the accompanying drawing, and the appended claims.

DESCRIPTION OF THE DRAWING

The single drawing is a perspective view partially broken away of a glove illustrating the invention.

DETAILED DESCRIPTION OF THE INVENTION

Referring to the single drawing, a work glove 10 is shown with a foamed surface 12. The breakaway line 26 delineates the border between the substrate 16 and the backside surface 12. The glove 10 includes a thumb portion 18 and individual finger portions 14. The backside portion 12, may or may not be coated with the foam surface of the invention depending upon particular applications, while the palm portion as represented by the surface 20 on thumb 18 and surface 21 will be coated to provide the surface of the invention.

Generally, however, the entire glove liner, loaded on a form in conventional manner, will be dipped in the foamed material of the invention to coat at least all of the hand portion of the glove 10, with the possible exception of cuff 22. However, in many applications using conventional knitted glove liners, the entire liner will be dipped and coated with a foam coating according to the invention herein. The glove, in the vicinity of the wrist may include an elastic insert 24 in order to provide a gripping property to the glove around the wrist, once the glove is pulled onto the hand. A moisture barrier 28 may be applied to substrate material 16, if so required for certain applications.

Once the application is made of the compounded foamed material, it is then cured in place. The substrate may be formed first by having a sheet of the substrate woven or nonwoven fabric for example, and applying the foamed material to it and curing the foamed layer prior to taking that formed laminate material and cutting it into pieces to be sewn into an article. It is less expensive, however, from a production standpoint, as will be understood by practitioners in the art, to dip an entire article already formed into the foamed material forming the outer surface, than to cause a coating to be formed on only selected portions of the article. However, full dipping uses more foamed material.

With respect to the foamed coating material used for applying to the substrate for forming the article, in accordance with this invention, representative such compositions are as follows. It is to be understood, however, that these representative compositions are being presented with the understanding that they are to have no limiting character on the broad disclosure of the invention as generally set forth herein and as directed to men skilled in the art.

| Material | Parts by Dry Weight |
|---|---|
| COMPOSITION 1 | |
| Polyvinyl Chloride Latex | 100 |
| Plasticizer | 0 to 120 |
| Surfactant | 1 to 5 |
| Pigment | 1 |
| Thickener | 5 |
| COMPOSITION 2 | |
| Acrylonitrile Latex | 100 |
| Surfactant | 0.15 to 1 |
| Zinc Oxide | 3 |
| Pigment, Thickener | 5 |
| COMPOSITION 3 | |
| Polyurethane Latex | 100 |
| Crosslinking Agent | 5 |
| Surfactant | 3 |
| Pigment | 1 |
| Thickener | 1 |

Once the foamed layer is applied, it is cured by conventional means including the application of heat, or by chemical cross-linking.

As further illustrative of the method of the invention, one may note the following example in which a laminate was prepared, which laminate was then cut into pieces and sewn into a glove. It is to be understood, however, that this example is being presented with the understanding that it is to have no limiting character on the broad disclosure of the invention as generally set forth herein and as directed to men skilled in the art.

EXAMPLE 1

A dipping compound was prepared having the following formulation:

| Material | Parts by Weight (Dry) |
|---|---|
| Polyurethane Latex | 100.00 |
| Surfactant | 0.10 |
| Crosslinker | 5.00 |
| Pigment | 1.00 |
| Defoamer | 1.00 |

Sufficient water was added to bring the total solids of the prepared compound to about 15%. Air was incorporated into the compound by means of a wire wisk attached to an air mixer to bring about a final compound comprising about 70% air and 30% compound by volume.

Glove liners comprised of a knitted cottonpolyester blend were loaded on forms in the usual manner and dipped in the compound as prepared above and withdrawn. The air incorporated into the compound causes "breaking" of the cells and excess compound drips off the liners during a dwell period of about three minutes.

The coated liners on the forms were then indexed to an upright position, and moved in the line through an oven for exposure to a temperature of about 280° F. for about 30 minutes.

After curing the gloves were stripped from the forms and found to have a compound buildup of 4 oz./yd.2 The gloves were found to be "breathable" and tested for abrasion resistance, under conventional test procedures the gloves were found to have a longer wearing life then the uncoated gloves, with superior abrasion and cut resistance.

While the methods and products herein disclosed form preferred embodiments of the invention, this invention is not limited to those specific methods and products, and changes can be made therein without departing from the scope of the invention, which is defined in the appended claims. For example, as will be appreciated by practitioners-in-the-art, various polymeric coatings may be utilized selected from a wide variety of polymers in order to have an ultimate surface of varying properties and appearance depending upon the application of the apparel which may be formulated. Also, it will be appreciated that a substrate may be formed to provide, initially, a roughened surface to which the foamed material is applied in order to provide a combination textured gripping surface.

As illustrative of a procedure for providing such a textured substrate surface for the subsequent application of the foamed material, in accordance herewith, reference is made to U.S. Pat. No. 4,359,783 which is incorporated herein by reference in its entirety. The development of a roughened textured substrate in accordance with the teachings of that application may be useful, depending upon the subsequent use to which an article formed in accordance with this invention is to be used. That is, a surface which is porous and provides in addition, a textured gripping action will enhance the ability of a workman, for example, to grip and hold objects in the work environment.

It will be appreciated further, that the objects of the invention herein, since they may be formed into final articles prior to the application of a foamed surface, or they may be formed from a previously prepared laminate of the foamed surface herein and a substrate, many different mass production techniques may be utilized in the formulation of articles in accordance with this invention. Obviously a variety of mass production techniques may be applied making the products of the invention here highly advantageous commercially.

What is claimed is:

1. A method for producing a glove with a breathable, inexpensive, abrasion-resistant surface, characterized by the steps of
    (a) selecting in a first selecting step a glove liner comprised of a web which is a member selected from the group consisting of a fibrous non-woven web, a woven web, and a knitted web;
    (b) selecting in a second selecting step a material to be applied as a foamed layer to at least one surface of said glove liner from said first selecting step;
    (c) foaming said member selected from said second selecting step to an air content within the range of between about 40 and 95 percent;
    (d) applying said member from said foaming step to said at least one surface of said glove liner; and
    (e) curing said foamed member from said applying step.
2. The method of claim 1, further characterized by:
    (a) said foaming step being carried out to provide an air content within the range of between about 60 and 80 percent.
3. The method of claim 1, further characterized by:
    (a) said member from said first selecting step being selected from the group consisting of wool, polypropylene, polyethylene, polyacrylonitrile, nylon, and mixtures thereof.
4. The method of claim 1, further characterized by:
    (a) said member from said second selected step being selected from the group consisting of polyurethane, polyvinyl chloride, acrylonitrile, natural rubber, synthetic rubber, and mixtures thereof.
5. The method of claim 1, further characterized by:
    (a) prior to said foaming step admixing said member from said second selecting step with water to a solids content within the range of between about 5 and 75 percent.
6. The method of claim 5, further characterized by:
    (a) said admixing step being carried out to a solids content within the range of between about 10 and 30 percent.

* * * * *